May 22, 1923.
O. W. PAUSCH
SWINGING SPOOL CARRIAGE
Filed Oct. 20, 1922   2 Sheets-Sheet 1
1,455,806
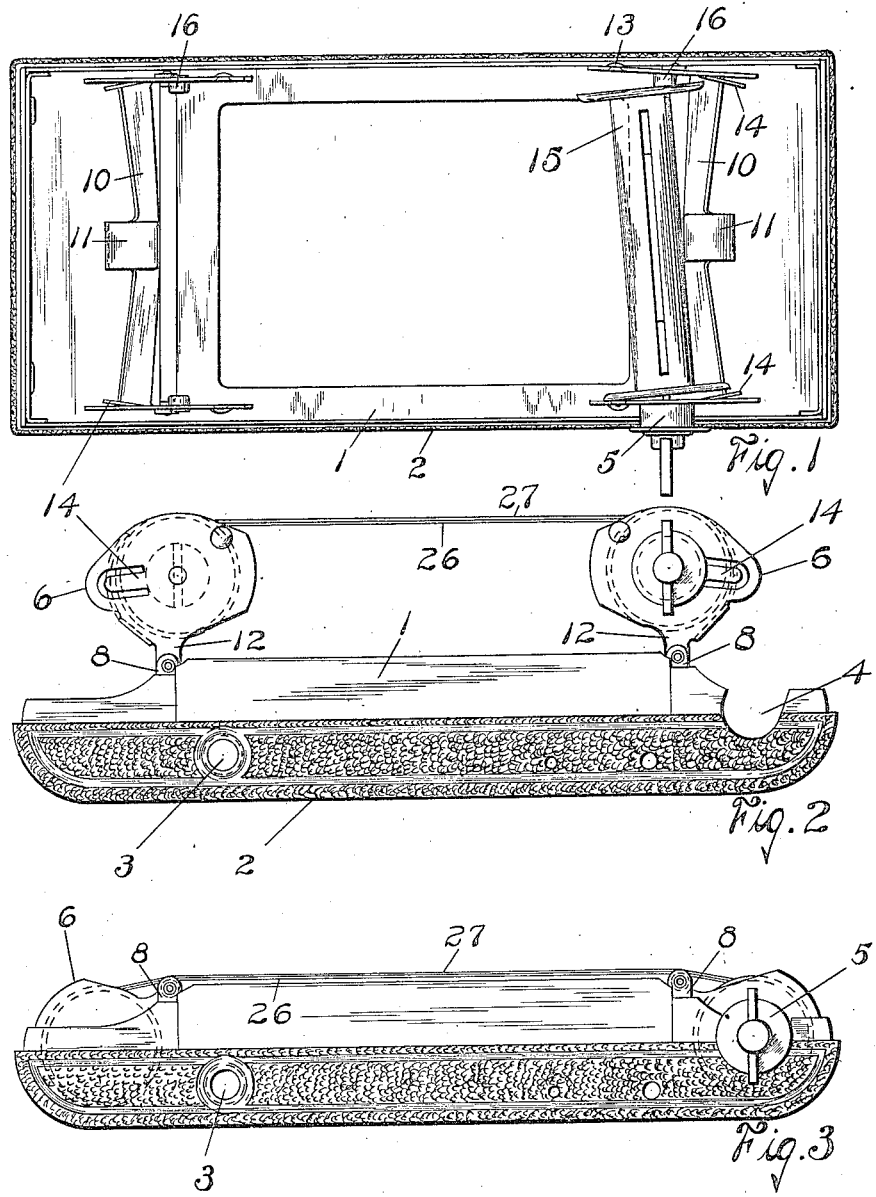
INVENTOR
OLIVER W. PAUSCH
BY
ATTORNEY May 22, 1923.

O. W. PAUSCH

SWINGING SPOOL CARRIAGE

Filed Oct. 20, 1922   2 Sheets-Sheet 2

1,455,806

INVENTOR
OLIVER W. PAUSCH
BY
Philip S. Hopkins
ATTORNEY

Patented May 22, 1923.

1,455,806

UNITED STATES PATENT OFFICE.

OLIVER W. PAUSCH, OF SAN FRANCISCO, CALIFORNIA, ASSIGNOR TO ANSCO COMPANY, OF BINGHAMTON, NEW YORK, A CORPORATION OF NEW YORK.

SWINGING SPOOL CARRIAGE.

Application filed October 20, 1922. Serial No. 595,864.

*To all whom it may concern:*

Be it known that I, OLIVER W. PAUSCH, a citizen of the United States, and a resident of San Francisco, county of San Francisco and State of California, have invented a new and useful Improvement in a Swinging Spool Carriage, of which the following is a description, reference being had to the accompanying drawings, in which like reference numerals indicate like parts.

This invention relates particularly to swinging film spool carriages for cameras and the embodiments shown and described are directed to such use. It will be readily understood, however, that the device is of broad application and adapted for use in any art in which a web or film is to be wound from one spool to another.

Heretofore swinging film spool carriages have been pivoted directly upon the trunnions on the anti-friction roller. This method of mounting the spool carriers has proven unsatisfactory and impractical because of the tendency of the carriers to bind the roller and prevent rotation thereof when strain is placed upon the carrier by winding a film from one spool to the other. It is the principal object of this invention to eliminate this difficulty by providing pivot means for the spool carrier which in no way affects the free rotation of the anti-friction roller. As will be readily understood from the accompanying description and drawings, a spool having a rolled film thereon is placed in one end of the camera, the free end of the film being attached to a spool mounted in the opposite end of the camera upon which the film is wound by rotation of said last mentioned spool through the medium of the winding key. My invention embraces means in the form of pivoted carriages or carriers in which the spools are mounted, thus providing ready access to the same as well as the greatest ease in placing the spools in position.

It is a further object to utilize the pivoted means of said spool carriages as bearings for the anti-friction roller thus providing a simple, cheap and compact organization of few parts to create a very desirable and efficient spool carriage, and eliminating the undesirable features heretofore encountered.

It is also an object of this invention to provide the spool carriages with means whereby, when the film is drawn from one spool to another, very little friction against the film will be encountered thus preventing scratching or rubbing of the film during the winding operation.

A still further object is to so construct the parts of the spool carriers that a high degree of rigidity and stableness is provided. This makes possible greater accuracy in winding the film, while at the same time permitting perfect freedom of movement of the same.

Other objects and advantages in details of construction and operation will be apparent as the description proceeds, reference being had to the accompanying drawings wherein like reference numerals indicate like parts.

In the drawings:

Figure 1 is a plan view of a camera body with top and inner parts removed, showing the location and operation of my improved spool carriers.

Figure 2 is a side view of the same showing the spool carriers raised to loading position and charged with a film.

Figure 3 is also a side view similar to Figure 2 showing the carriers in their lowered position.

The numeral 1 indicates generally the front body portion of a camera, parts of which are covered with leather or other suitable material as indicated at 2. The camera 1 is provided with a tripod recess indicated at 3. One end of the camera has a recess 4 cut therein as shown clearly in Figure 2 for the reception of the spool winding means indicated at 5.

Figure 4:
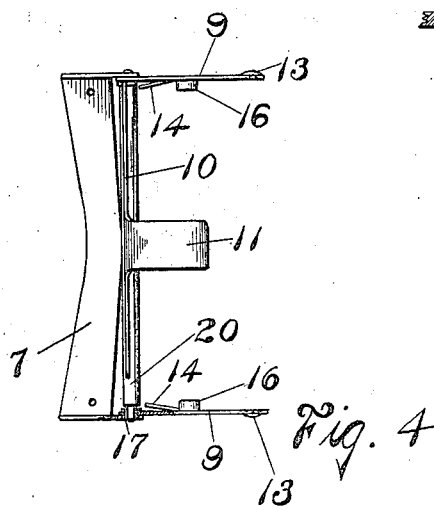
Figure 4 is a plan view of a single carrier having parts of one end broken away to show the pivoting means for said carrier.
Figure 5:
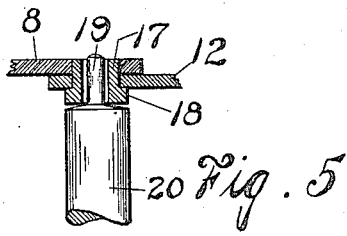
Figure 5 is a detail view showing my preferred form of pivot for said spool carrier.

Mounted within this portion of the camera body and adjacent each end thereto, are my improved spool carriages indicated generally by the reference numeral 6. These spool carriages are constructed entirely of thin sheet metal having resiliency and flexibility. The carriages 6 are mounted within the camera body by means of a plate 7 which is secured thereto in any suitable manner. The plate 7 is provided at its ends with flanges which form upstanding arms or lugs 8 to which the swinging portions on the carriages are pivoted as shown clearly in Figures 2 and 4. Such swinging portions are constructed of one piece and include end members 9 connected by a thin strip of metal 10 from which extends a spring arm 11. The ends 9 are provided with off-set lugs 12 by means of which said carriage is pivoted to the rigid arms 8 in a manner about to be described. The ends 9 are also provided with lugs 13 formed by indenting said ends. These lugs 13 project outwardly towards the sides of the camera and in the event of said ends 9 becoming bent outwardly beyond the plane of the sides of the camera, engage therewith when the carriage is lowered into the position shown in Figure 3, thus guiding the carriage into its proper position and holding the ends 9 at correctly spaced distances to receive the spool trunnions. A resilient tongue 14 is also struck from each end 9 for the purpose of frictionally engaging the ends of the film spools 15 and holding them tightly in place. Each end member is further provided centrally thereof with pivot lugs 16 extending inwardly and upon which the film spools 15 are rotatably mounted.

The pivot means for the swinging carriages comprises a bushing 17 rigidly mounted in the upper end of each arm 8. This bushing has a flange 18 at the inner end thereof and is of such length to provide a bearing surface between said flange and the arm 8. Upon this bearing surface is rotatably mounted the swinging carriage through the medium of the lugs 12. The bushings 17 are hollow thus providing inner bearings for the trunnions 19 on the anti-friction rollers 20.

It will be readily seen that by means of this pivot construction the bearings of the swinging carriage and the anti-friction roller are entirely independent and, therefore, any strain on the spool carriage will in no way affect the free rotation of the roller. As shown, the ends of the anti-friction rollers are beveled, which feature also contributes to the free rotation thereof.

Figure 6:
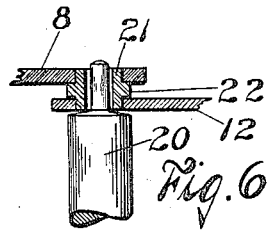
Figures 6, 7, 8 and 9 are detail views similar to Figure 5 but showing modified forms of carrier pivoting means.

Figure 6 shows a modified form of pivoting means which includes a hollow bushing 21 secured in each arm 8 and having a centered flange 22. In this form the spool carriage is pivoted upon the bushing between the flange 22 and anti-friction roller 20. The operation and function of this form is identical with that just described.

Figure 7:
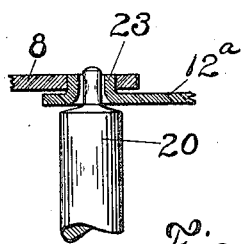

In Figure 7 is shown a still further modification of pivoting means and in this instance includes an eyelet 23 drawn from the end of the lug 12$^a$ and rotatably mounted in the arm 8. The bearing for the anti-friction roller 20 is, as in the previous forms, within the hollow portion of the eyelet. This construction is, in some respects, to be preferred over those just described; the principal advantage being in the cheapness of manufacture of the same.

Figure 8:
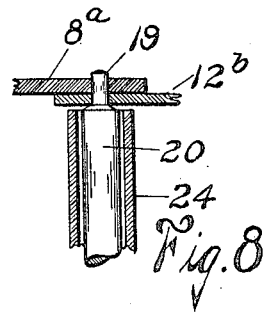

Figure 8 illustrates another form of pivoting means which also allows the free rotation of the anti-friction roller independent of the spool carriage. In this modification the trunnions 19 on the roller 20 extend through the lug 12$^b$ and arm 8$^a$, thus forming the pivot for the spool carriage. Loosely mounted upon the roller 20 is a sleeve 24 which rotates freely thereon.

Figure 9:
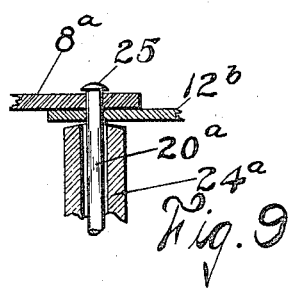

The type of pivot shown in Figure 9 is similar to that of Figure 8 except that the outer end of the roller 20$^a$ is provided with head 25 which secures the same to the arm 8$^a$. Also in this type the sleeve 24$^a$ is beveled at the ends thus forming a further safeguard against binding.

Briefly the operation of the device is as follows, after the back of the camera has been removed, the pivoted carriages 6 are swung up into the position shown in Figure 2 and an empty film spool 15 snapped into position in the right end carriage. This spool comprises the take-up roller for the film and is rotated by the usual winding key mechanism 5. The roller having the film wound thereon is snapped into the left end carriage in Figures 1 to 3 and the free end of the film secured to the take-up roller in the usual manner. The carriages are then swung or lowered into the position shown in Figure 3, in which position the film, designated at 26, is brought into direct contact with the anti-friction rollers 20. The usual paper protective covering for the film is indicated at 27.

After the cover has been replaced on the camera, the film is wound upon the take-up roll after each exposure in the usual manner. The arms 11 on the spool carriages act as guides for the film and being under tension, due to their construction of spring metal, act as brakes thus preventing loose winding or over running of the film. The fingers 14 struck from the ends of the spool carriage bear frictionally against the ends of the spools and also perform the braking function just described.

During the winding operation, considerable strain is placed on the spool carriages tending to pull them inwardly towards one another. By virtue of my improved pivoting means for said carriages, such strain is entirely independent of the anti-friction rollers over which the film is drawn, thereby allowing said rollers to be turned freely by the film as it passes there over and in this way avoiding scratching or rubbing of the film as would be the case were the rollers prevented from free rotation. It may be added that the anti-friction rollers have highly polished hard surfaces, offering little or no resistance to the film in its passage thereover.

It will thus be seen that I have provided a practical, simple, cheap and efficient attachment for cameras whereby loading and unloading thereof is greatly simplified and the important operation of winding the film is rendered positive and accurate. Of course, the exact form shown and described above has to be taken as illustrative only for obviously the device is susceptible to various changes in details of construction and function without departing from the scope of the invention. I do not, therefore, limit myself to the form shown other than by the appended claims.

I claim:

1. In a swinging spool carriage comprising a spool carrier, pivot members therefor, and a roller mounted to rotate in said pivot members.

2. In a swinging spool carriage comprising a spool carrier, pivot members therefor, and a roller mounted to rotate in said pivot members in bearings independent of the spool carrier.

3. In a swinging spool carriage, a pivoted spool carrier, and an anti-friction roller, pivot members having two bearing surfaces whereby the spool carrier and said roller may have free movement independent of each other.

4. In a swinging spool carriage comprising in combination rigid journal plates, pivot members therein, a spool carrier pivoted on said members, and an anti-friction roller having bearings in said pivot members independent of said spool carrier.

5. In a swinging spool carriage comprising in combination rigid journal plates, a spool carrier, and an anti-friction roller, bushings in said journal plates providing separate bearings for said spool carrier and said roller.

6. In a swinging spool carriage comprising in combination rigid journal plates, a spool carrier, and an anti-friction roller, hollow bushings in said journal plates, said spool carrier being pivoted on the outer bearing surface of said bushings and said roller having bearings within said hollow bushings.

7. In a swinging spool carriage comprising two rigid uprights, bushings having outer and inner bearing surfaces secured to the upper ends thereof, the spool carrier hinged on said bushings on the outer surface thereof, and an anti-friction roller mounted to rotate in said inner bearing surfaces.

8. In a swinging spool carriage comprising in combination rigid journal plates, hollow bushings having a flange at one end thereof mounted in said journal plates, a spool carrier pivoted on said bushings between said journal plates and said flanges, and an anti-friction roller having reduced end trunnions mounted for rotation within said hollow bushings.

OLIVER W. PAUSCH.